US012657811B1

(12) United States Patent
Nordling

(10) Patent No.: US 12,657,811 B1
(45) Date of Patent: Jun. 16, 2026

(54) SYSTEMS AND METHODS FOR ACCELERATED RADIANCE FIELD TRAINING VIA SELECTIVE PRIMITIVE REUSE

(71) Applicant: Miris, Inc., Culver City, CA (US)

(72) Inventor: Joseph Nordling, Tallahassee, FL (US)

(73) Assignee: Miris, Inc., Culver City, CA (US)

( * ) Notice: Subject to any disclaimer, the term of this patent is extended or adjusted under 35 U.S.C. 154(b) by 0 days.

(21) Appl. No.: 19/459,553

(22) Filed: Jan. 26, 2026

(51) Int. Cl.
    *G06T 15/08*     (2011.01)
    *G06T 17/20*     (2006.01)
    *G06V 10/74*     (2022.01)

(52) U.S. Cl.
    CPC .............. *G06T 15/08* (2013.01); *G06T 17/20* (2013.01); *G06V 10/761* (2022.01)

(58) Field of Classification Search
None
See application file for complete search history.

(56) References Cited

U.S. PATENT DOCUMENTS 12,406,430 B1 *  9/2025  Lesser ..................... G06T 7/579
12,505,269 B2 *  12/2025  Yuan ....................... G06F 30/27
12,541,911 B1 *  2/2026  Nordling ................. G06T 15/10
2025/0111588 A1 *  4/2025  Kreis ..................... G06T 15/005
2025/0157114 A1 *  5/2025  Yuan ....................... G06T 13/40

* cited by examiner

*Primary Examiner* — Yanna Wu
(74) *Attorney, Agent, or Firm* — Ansari Katiraei LLP; Arman Katiraei; Sadiq Ansari

(57) ABSTRACT

A radiance field generation system (RFGS) and associated methods perform accelerated training of variant three-dimensional (3D) assets through selective primitive reuse. The RFGS receives a base 3D asset and a variant 3D asset and generates a first radiance field representation of the base asset with splat primitives. Matching regions between the 3D assets are identified by comparing images of the 3D assets rendered from corresponding viewpoints. Splat primitives in the first radiance field representation that represent the matching regions are locked, marking them as immutable and excluding them from parameter adjustments during subsequent optimization. The RFGS generates a second radiance field representation of the variant 3D asset by reusing the locked splat primitives without modification while iteratively optimizing a second subset of splat primitives representing differing regions. This spatially constrained optimization significantly reduces training iterations and computational overhead by focusing optimization solely on detected areas of difference.

20 Claims, 6 Drawing Sheets

Receive base 3D asset and a variant

Detect attribute difference

Generate radiance field representation

Lock primitives except for attributes at differing regions

Iterate to adjust attributes at differing regions

SYSTEMS AND METHODS FOR ACCELERATED RADIANCE FIELD TRAINING VIA SELECTIVE PRIMITIVE REUSE

BACKGROUND

Radiance field representations, including Gaussian splatting, neural radiance fields (NeRFs), and related primitive-based techniques, are increasingly used to generate high-fidelity three-dimensional (3D) assets from sets of reference images. Training such representations typically requires a large number of iterative optimization steps or training iterations in which radiance field primitives are generated or adjusted, rendered, compared against ground-truth imagery, and refined (e.g., added, removed, or modified) to reduce reconstruction loss. As a result, generating a converged radiance field is computationally expensive and time-consuming, particularly for assets with complex geometry, lighting, or material properties.

Variant 3D assets may include models that share large amounts of geometry and/or visual characteristics and differ in certain attributes like color in some regions. Despite the similarities, conventional radiance field training techniques treat each of the variant 3D assets independently and retrain or regenerate all primitives from scratch, redundantly expending computational resources on regions that are effectively identical across the variant 3D assets. Accordingly, there is a need for systems and methods that reduce the cost and time of radiance field training by selectively reusing previously trained primitives and constraining optimization to those regions of a 3D asset that meaningfully differ from an existing radiance field representation.

DETAILED DESCRIPTION OF PREFERRED EMBODIMENTS

Figure 1:
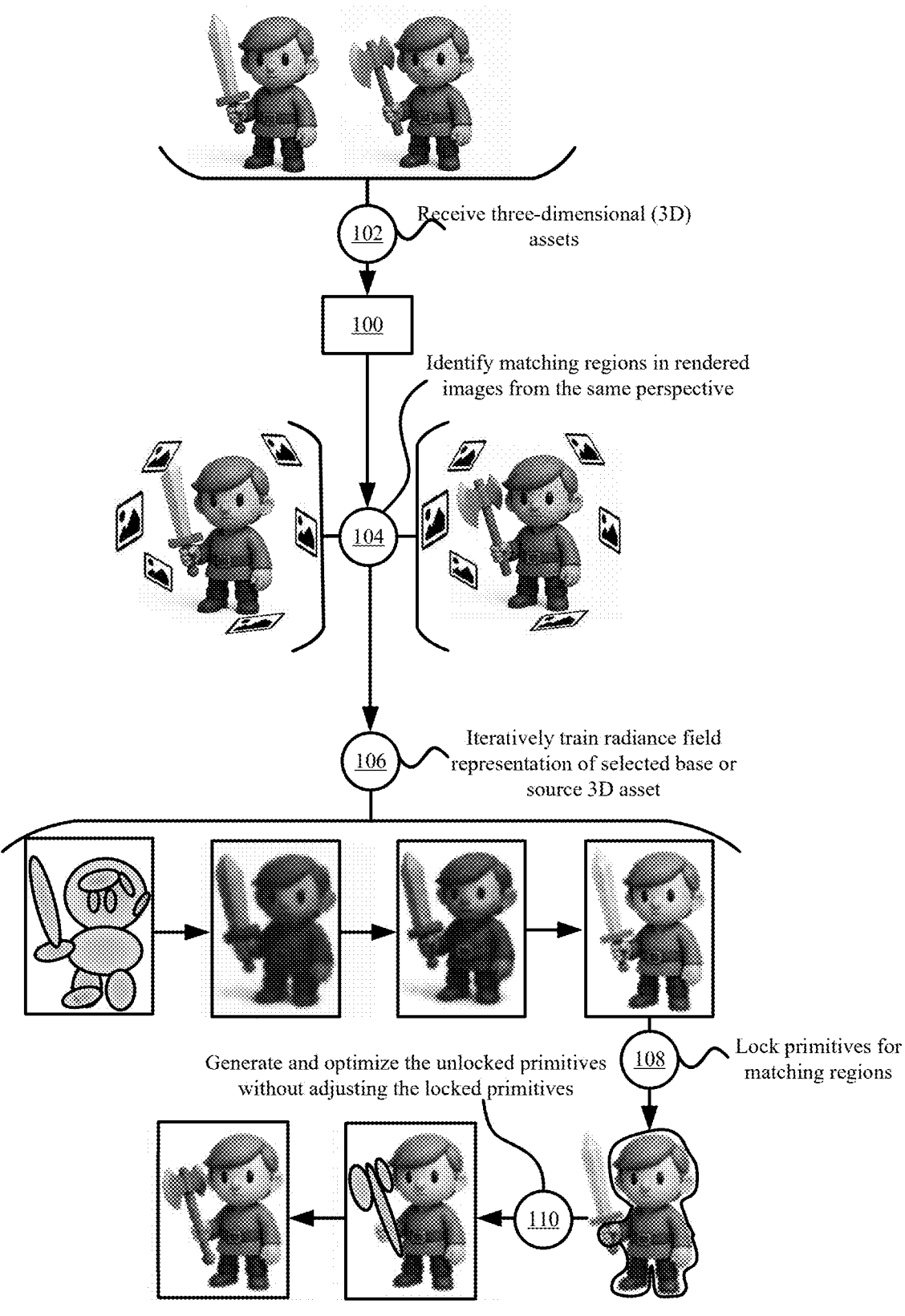
FIG. 1 illustrates an example of the accelerated radiance field training for variant three-dimensional (3D) assets via selective reuse and freezing of radiance field primitives in accordance with some embodiments described herein.

The following detailed description refers to the accompanying drawings. The same reference numbers in different drawings may identify the same or similar elements.

Provided are systems and associated methods for accelerated radiance field training via selective primitive reuse. The accelerated radiance field training reduces the computational cost and time required to train radiance field representations, such as three-dimensional (3D) Gaussian splatting representations, neural radiance fields (NeRFs), or other primitive-based radiance field encodings, for variant 3D assets by selectively reusing primitive data from regions of a previously trained source 3D asset that match corresponding regions in the variant 3D asset and by iteratively optimizing only the primitive data for regions of the variant 3D asset that differ from corresponding regions of the source 3D asset. Consequently, the training converges in significantly fewer iterations as the training is focused on the subset of the variant 3D asset that differs from the source 3D asset.

In some embodiments, a radiance field generation system (RFGS) analyzes a source 3D asset and a variant 3D asset to identify similarities prior to or during training. The analysis may include comparing source files or original encodings of the 3D assets to detect differences in geometry, positioning, colors, opacity, reflectivity, and/or other structural or visual attributes. The comparison may include rendering both 3D assets (e.g., the source 3D asset and the variant 3D asset) from identical camera positions or viewpoints and performing visual comparisons (e.g., a pixel-by-pixel comparison, structural similarity analysis, and/or depth data analysis) of the images rendered from the common viewpoint to identify regions of difference. Regions of the rendered images that differ by less than a threshold amount are identified as matching regions and mapped back to corresponding spatial regions of the original 3D assets or the source 3D asset, such as by tagging meshes, surface regions, or other spatial groupings. In some embodiments, the RFGS uses the depth data from the rendered images to plot mismatch points or regions in 3D space. Based on these points, the RFGS builds a 3D geometry, such as a quadtree or a watertight mesh, to map mismatch or differing regions to the source 3D asset.

The RFGS trains a radiance field representation for one of the 3D assets, such as the larger, more complex, or otherwise designated source 3D asset. The training includes generating a radiance field representation in a format that differs from the original encoding of the 3D asset. For instance, the training may generate a set of Gaussian splats or other radiance field primitives that reconstruct the visual detail of the source 3D asset from reference images. Primitives from the radiance field representation that represent the regions identified as matching are selectively locked or frozen.

To train or generate the radiance field representation for the variant 3D asset, the RFGS retains without modification the locked or frozen primitives from the radiance field representation of the source 3D asset and iteratively optimizes the regions represented by the unlocked or unfrozen primitives of the radiance field representation generated for the source 3D asset. In other words, the RFGS reuses the position, scale, opacity, orientation, and/or other attributes of the locked or frozen primitives in generating the radiance field representation for the variant 3D asset and generates new primitives or modifies the unlocked, unfrozen, or newly generated primitives until the differing regions match with a threshold accuracy to the representation of those regions in the variant 3D asset.

By locking primitives associated with matching regions, the optimizer is forced to focus exclusively on regions that differ between the source 3D asset and the variant 3D asset. Moreover, since the optimizer cannot modify attributes of the primitives in the locked regions, backpropagation of loss is focused solely on the detected areas of difference. Accordingly, the number of training iterations for generating the radiance field representation for the variant 3D asset is greatly reduced (e.g., from 30,000 iterations to as few as 5,000 iterations) and the time for each training iteration is further reduced as the training applies only to a subset of the variant 3D asset that includes the regions differing from those of the source 3D asset.

In some embodiments, the RFGS analyzes loss contributions or differences between the source 3D asset and the variant 3D asset at an attribute level for individual radiance field primitives. For instance, the RFGS may determine whether reconstruction loss is primarily attributable to differences in color attributes, positional attributes, scale attributes, or other primitive parameters. Attributes with loss contributions below a mismatch threshold may be selectively frozen even when other attributes of the same primitive remain trainable, further constraining optimization and accelerating convergence of the variant radiance field training.

FIG. 1 illustrates an example of the accelerated radiance field training for variant 3D assets via selective reuse and freezing of radiance field primitives in accordance with some embodiments described herein. The illustrated accelerated radiance field training is applicable to Gaussian splatting representations, neural radiance fields, and other primitive-based radiance field encodings.

RFGS 100 receives (at 102) two or more 3D assets. A first 3D asset may be a base or source 3D asset and another 3D asset may be a variant of the base or source 3D asset. For instance, the variant 3D asset represents an object, scene, and/or environment that shares substantial similarity in geometry and/or visual appearance while differing in a limited subset of regions or attributes from the base or source 3D asset. The 3D assets may correspond to different configurations of the same object, such as objects with identical structural geometry but different colors, materials, surface markings, or added or removed components. For instance, the base or source 3D asset may correspond to a 3D character model with a first accessory (e.g., a sword) and the variant 3D asset may correspond to the same character model with a different second accessory (e.g., an axe).

The received (at 102) 3D assets may be provided in any non-radiance-field encoding, including mesh models, point clouds, procedural geometry, or other 3D asset formats. Accordingly, the 3D assets may be defined with a connected set of meshes, a distributed set of points, or other primitives of a non-radiance-field encoding. In some embodiments, the 3D assets originate from a common content source and may share identical coordinate frames, topology, or material assignments, although such correspondence is not required. In some other embodiments, RFGS 100 generates the 3D assets from different reference images that capture the reference objects from different perspectives.

RFGS 100 compares (at 104) the 3D assets to one another to identify matching regions and differing regions between the 3D assets. In some embodiments, RFGS 100 performs the comparison (at 104) by rendering the 3D assets from the same positions and/or fields-of-view and comparing the rendered images that are generated from identical or corresponding viewpoints. In particular, the RFGS 100 renders each 3D asset from the same camera positions and orientations and compares the resulting rendered images using one or more visual comparison techniques, such as pixel-by-pixel difference analysis, structural similarity metrics, perceptual similarity models, and/or depth-aware comparisons.

Regions of the rendered images that differ by less than a defined threshold are classified as matching regions. The threshold may be defined in image space, depth space, or a combination thereof and may represent an exact match requirement or a tolerated deviation depending on implementation. For instance, pixels that differ by less than 10% in color values may still be classified as matching pixels.

Using depth data from the 3D assets or ray intersection information from the renderings, RFGS 100 may map the matching regions identified in image space back to corresponding spatial regions of the 3D assets. In some embodiments, RFGS 100 plots mismatch points in 3D space and uses the plotted mismatch points to build a 3D geometry (e.g., a quadtree or a watertight mesh) that defines which regions of the assets are subject to the modified training.

RFGS 100 iteratively trains (at 106) a radiance field representation for the base or source 3D asset. In some embodiments, the base or source 3D asset may be the received (at 102) 3D asset that has a larger size, greater complexity, is defined more completely, or is designated by a user or system policy. The training (at 106) is performed using standard radiance field training techniques in which radiance field primitives are generated or refined through iterative optimization to reconstruct visual details from reference images of the source or base 3D asset with a threshold amount of loss. At the end of every training iteration, the generated or refined set of splats may be rendered from the same position and/or orientation as the reference images, a loss function may compute the difference between the rendered images and the reference images, and another training iteration may be performed to reduce the loss or detected differences. In some embodiments, the radiance field representation trained (at 106) for the base or source 3D asset may be a splat-based representation, such as a 3D Gaussian splatting representation. In a splat representation, the radiance field is encoded as a collection of discrete splats each of which represents a localized volumetric element of the 3D asset. A splat may be defined by a mean position in three-dimensional space (e.g., x, y, and z coordinates), a covariance matrix or equivalent parameters that define the spatial extent, scale, and orientation of the splat, one or more color or appearance parameters (e.g., spherical harmonic coefficients for view-dependent color), and/or an opacity or alpha value that determines the splat's contribution to rendered pixels. During rendering, splats contribute to pixel values along projected rays based on their spatial overlap, opacity, and appearance parameters, and the collective set of splats reconstructs the visual detail of the 3D asset from different viewpoints. Training (at 106) the splat representation includes iteratively generating, removing, or modifying splats and adjusting their parameters through gradient-based optimization to reduce reconstruction loss relative to reference images.

Upon completion or partial completion of training (at 106) for the base or source 3D asset, RFGS 100 associates subsets of the trained radiance field primitives (e.g., splats) with the spatial regions previously identified as matching regions. RFGS 100 locks (at 108) the subsets of primitives associated with the matching regions. A locked primitive refers to a radiance field primitive that remains active during rendering but whose parameters are excluded from modification or cannot be adjusted during training of the variant 3D asset or subsequent optimization or backpropagation steps. In particular, locking (at 108) a primitive may include freezing one or more primitive parameters, including position, scale, orientation, opacity, color, spherical harmonic coefficients, or other attributes. In some embodiments, all parameters of a primitive associated with a matching region are locked. In other embodiments, only a subset of parameters is locked based on an analysis of attribute-level loss contributions, while remaining parameters of the same primitive remain adjustable.

After locking (at 108) the primitives associated with the matching regions, RFGS 100 generates and optimizes (at 110) unlocked primitives to include with the locked primitives in order to produce a radiance field representation of the variant 3D asset. In other words, the locked primitives are reused without adjustment in the radiance field representation of the variant 3D asset. RFGS 100 generates and modifies unlocked primitives or primitives that are not locked from the radiance field representation of the base or source 3D asset to reconstruct the regions of the variant 3D asset that differ from the base or source 3D asset.

Optimizing (at 110) the unlocked primitives includes computing loss across rendered images of the iteratively generated radiance field representation of the variant 3D asset. However, gradients associated with the locked primitives may be suppressed such that loss backpropagation affects only the unlocked primitives. As a result, optimization (at 110) is constrained to the regions of difference between the 3D assets, significantly reducing the number of training iterations and computational resources required to converge on an accurate radiance field representation for the variant 3D asset.

Accordingly, RFGS 100 efficiently reuses previously trained radiance field data while preserving visual fidelity and correctness when generating variant 3D assets. By focusing optimization on only the regions that meaningfully differ, RFGS 100 avoids redundant training of primitives that already accurately reconstruct shared geometry or appearance across the variant 3D assets.

Figure 2:
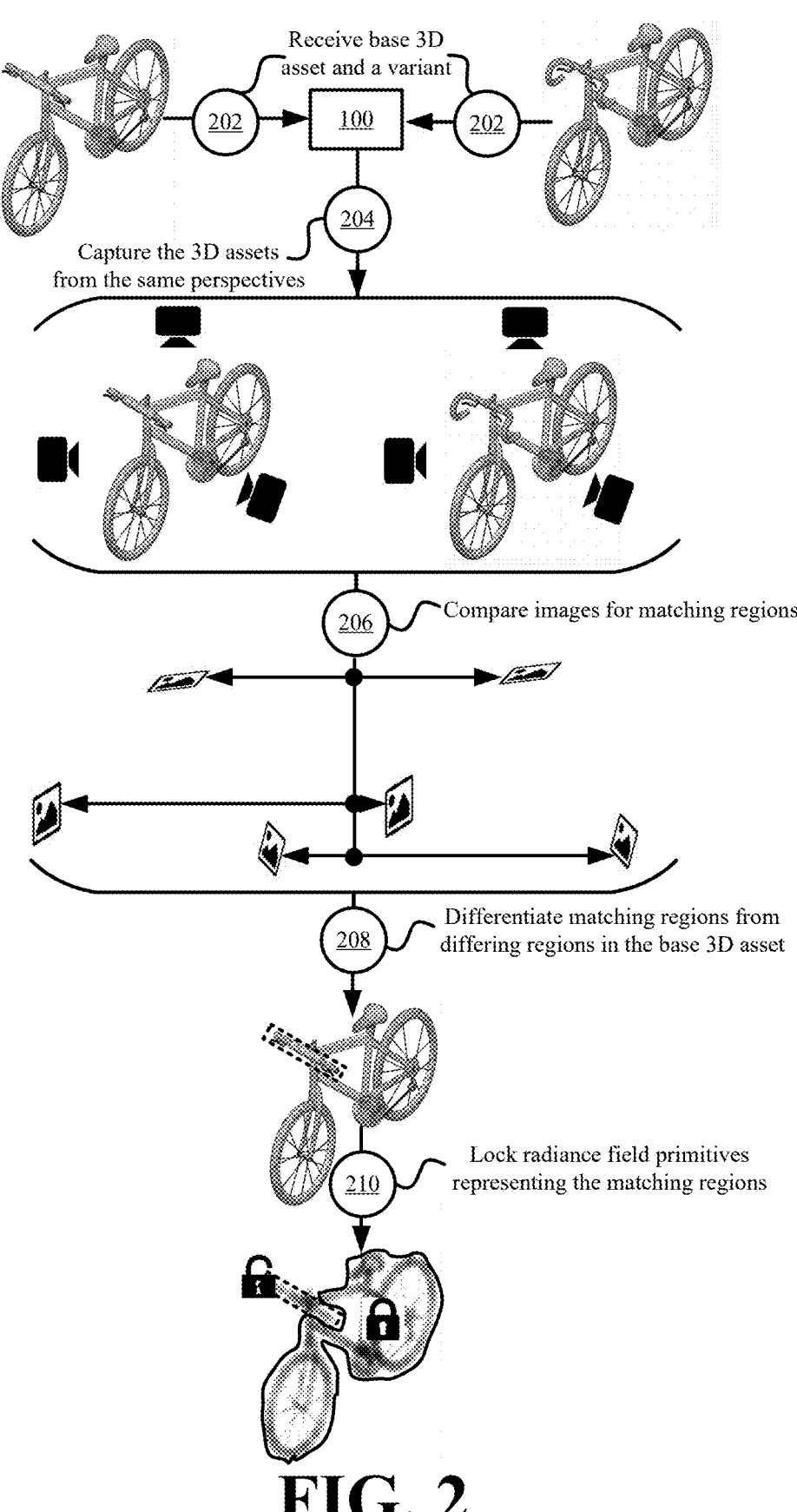
FIG. 2 illustrates an example for comparing a base or source 3D asset to a variant 3D asset in order to identify matching regions and differing regions that are used to constrain subsequent radiance field training in accordance with some embodiments described herein.

FIG. 2 illustrates an example for comparing a base or source 3D asset to a variant 3D asset in order to identify matching regions and differing regions that are used to constrain subsequent radiance field training in accordance with some embodiments described herein. In particular, FIG. 2 illustrates the visual comparison between the 3D assets that is performed in image space using renderings from common viewpoints and that is mapped back to spatial regions of the base or source 3D asset for region-level primitive locking.

RFGS 100 receives (at 202) a base or source 3D asset and a variant 3D asset. The base or source 3D asset and the variant 3D asset may be provided in any non-radiance-field encoding, including mesh models, point clouds, procedural geometry, or other 3D asset formats. The variant 3D asset may differ from the base or source 3D asset by one or more localized geometry changes (e.g., an added component), localized appearance changes (e.g., a color change for a subset of surfaces), material changes, texture changes, and/or other structural or visual differences.

RFGS 100 captures (at 204) the base or source 3D asset and the variant 3D asset from the same perspectives. The capturing (at 204) includes positioning one or more virtual cameras at a common set of camera poses relative to each 3D asset and generating one or more images of each 3D asset from each camera pose. A camera pose may include a camera position, orientation, and one or more intrinsic parameters (e.g., focal length, principal point, and/or lens model) that collectively define a field-of-view. In some embodiments, RFGS 100 determines the common set of camera poses using a camera placement algorithm that distributes cameras around a bounding volume of the base or source 3D asset to achieve a target or complete coverage of the asset surfaces. In some embodiments, the same set of camera poses is reused across both assets by applying a common coordinate frame or by aligning the assets to a shared coordinate frame (e.g., through known transform metadata, registration, or an iterative alignment). In some embodiments, capturing (at 204) includes generating auxiliary render outputs for each view, such as depth maps, surface normal maps, object/instance identifiers, material identifiers, and/or other per-pixel buffers that assist with mapping image-space differences to 3D space.

RFGS 100 compares (at 206) images of the base or source 3D asset and images of the variant 3D asset for matching regions. For each camera pose from the common set of camera poses, RFGS 100 pairs a rendered image of the base or source 3D asset with a rendered image of the variant 3D asset that is generated from the same camera pose and performs one or more similarity measurements between the paired images. The similarity measurements may include a per-pixel difference measurement in which corresponding pixels are compared based on color channels and/or luminance, a structural similarity measurement that quantifies similarity of local patterns and contrast, and/or a perceptual similarity measurement that emulates human perception of visual differences. In some embodiments, the comparisons are performed per pixel and aggregated into per-region scores by grouping pixels into patches, tiles, superpixels, segments, or other spatial partitions. In some embodiments, RFGS 100 generates a binary or probabilistic difference mask per viewpoint that identifies pixel locations that are likely to correspond to matching regions versus differing regions.

In some embodiments, RFGS 100 performs the comparison (at 206) with depth awareness to prevent false mismatches caused by parallax, occlusion differences, or view-dependent effects. For example, when depth maps are available or depths are computed from the original 3D asset encodings, RFGS 100 may ignore pixel differences that correspond to pixels with no valid geometry intersection in one asset but not the other, or may weight differences according to depth discontinuities. In some embodiments, the comparison (at 206) includes normalizing render outputs to reduce sensitivity to lighting differences, exposure differences, tone-mapping differences, or background differences between the paired images.

RFGS 100 differentiates (at 208) matching regions from differing regions in the base or source 3D asset and the variant 3D asset based on the image comparisons. Differentiating (at 208) includes projecting or mapping image-space difference information from the paired renderings back to spatial regions of the base or source 3D asset. In some embodiments, RFGS 100 uses depth values associated with pixels flagged as mismatching to plot mismatch points in three-dimensional space, where each mismatch point corresponds to a 3D position on or near a surface of the base or source 3D asset. In other words, RFGS 100 may map the mismatch points from the captured (at 206) images back to the meshes, points, or other primitives of the base or source 3D asset. RFGS 100 may accumulate mismatch points across multiple viewpoints and may filter noise in the mismatch points using one or more outlier rejection techniques, clustering techniques, or morphological operations.

In some embodiments, differentiating (at 208) includes constructing a region representation from the accumulated mismatch points. The region representation may be a volumetric occupancy grid, an octree or quadtree subdivision, a set of bounding volumes, a segmented surface mesh, and/or a watertight mesh that encloses regions associated with mismatch points. Regions with mismatch point densities above a threshold may be classified as differing regions and regions without mismatch points or with mismatch point densities below a threshold may be classified as matching regions. In some embodiments, RFGS 100 expands differing regions by a margin or dilation amount to account for imperfect viewpoint coverage and to avoid locking or freezing primitives near region boundaries that may require refinement to accurately reconstruct the variant 3D asset.

RFGS 100 locks (at 210) radiance field primitives representing the matching regions in radiance field representation of the base or source 3D asset. In particular, RFGS 100 trains or generates a radiance field representation of the base or source 3D asset using standard training iterations. RFGS 100 maps the matching regions identified in the captured (at 206) or in the original encoding of the base or source 3D asset to subsets of radiance field primitives of the radiance field representation. The subsets of radiance field primitives are locked so that they are not modifiable or subject to training or optimization during training of the radiance field representation for the variant 3D asset.

Locking (at 210) the radiance field primitives may include marking the associated primitives with a non-trainable flag, excluding the associated primitives from gradient updates, setting learning rates for those primitives to zero, masking gradients for those primitives during backpropagation, and/or otherwise preventing parameter changes. In some embodiments, locking (at 210) is performed at a primitive level (e.g., all parameters of a primitive are locked when the primitive is within a matching region). In some other embodiments, locking (at 210) is performed at an attribute level in which only certain parameters of a primitive (e.g., position, scale, and/or orientation) are locked while other parameters (e.g., color or spherical harmonic coefficients) remain adjustable when the matching analysis indicates that only appearance differs and geometry matches.

By performing the capture (at 204), comparison (at 206), differentiation (at 208), and locking (at 210), RFGS 100 produces a spatially constrained and/or partially frozen initialization that enables subsequent training to focus on primitives and regions corresponding to the actual differences between the base or source 3D asset and the variant 3D asset, thereby reducing redundant optimization and accelerating convergence of the variant radiance field representation. In other words, the locked radiance field primitives may be used to initialize the training of the variant radiance field representation with a set of known accurate primitives for representing the matching regions or parts between the base or source 3D asset and the variant 3D asset.

Figure 3:
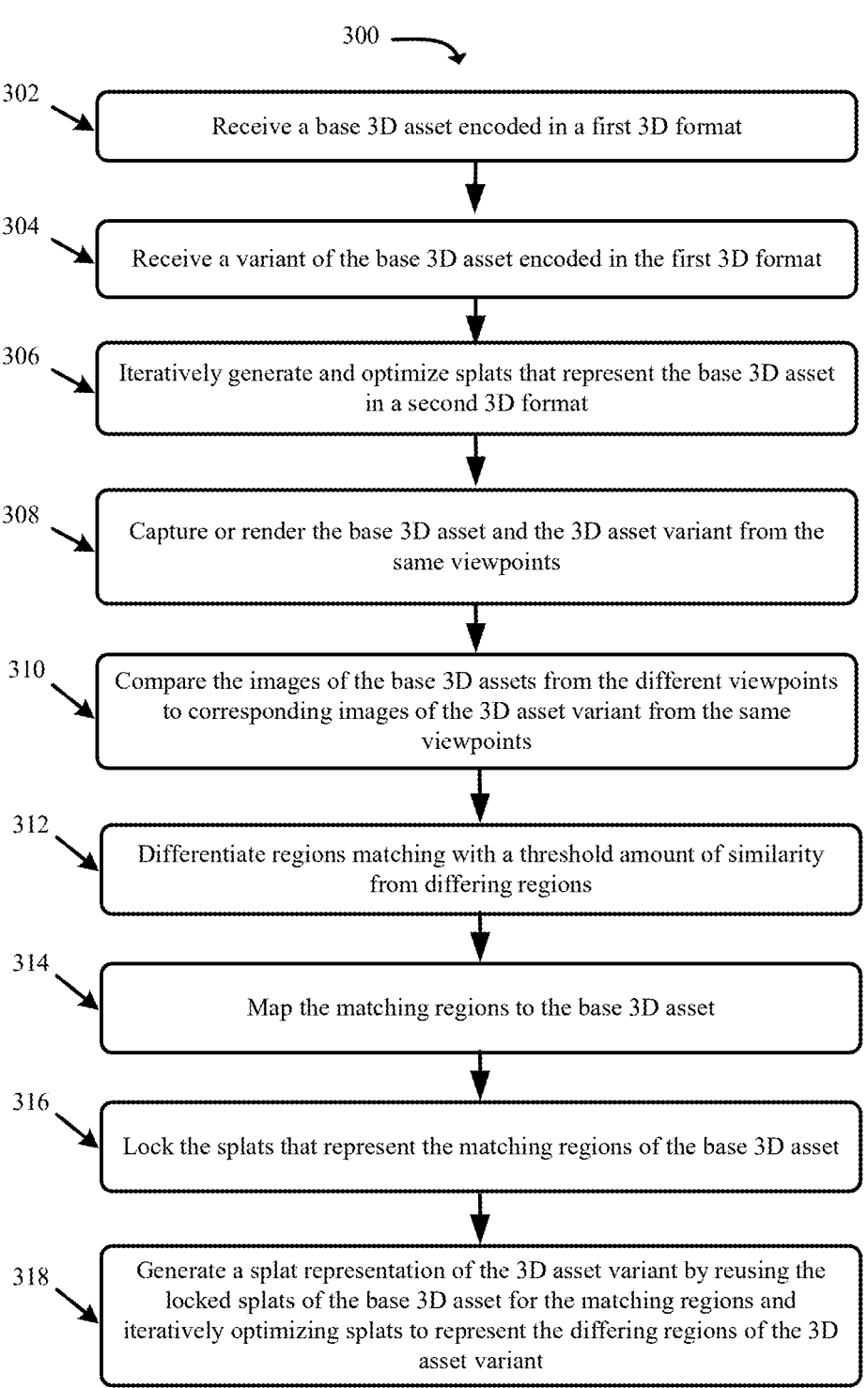
FIG. 3 presents a process for generating a radiance field representation of a variant 3D asset by selectively reusing locked radiance field primitives from a base or source 3D asset and iteratively optimizing the subset of primitives that correspond to differing regions in accordance with some embodiments described herein.

FIG. 3 presents a process 300 for generating a radiance field representation of a variant 3D asset by selectively reusing locked radiance field primitives from a base or source 3D asset and iteratively optimizing the subset of primitives that correspond to differing regions in accordance with some embodiments described herein. Process 300 is implemented by RFGS 100. RFGS 100 executes on one or more devices or machines with processor, memory, storage, network, and/or hardware resources that are configured to generate radiance field representations or encodings of a variant 3D asset by reusing locked primitives from the radiance field representation of the base or source 3D asset.

Process 300 includes receiving (at 302) a base or source 3D asset encoded in a first 3D format. The first 3D format may be a non-radiance-field encoding, such as a mesh model, point cloud, or procedural geometry. The base or source 3D asset may represent a canonical or reference version of an object, scene, or environment from which one or more variants are derived.

Process 300 includes receiving (at 304) a variant of the base or source 3D asset that is encoded in the first 3D format or another non-radiance-field encoding. The variant 3D asset may share a substantial portion of geometry, topology, and/or visual appearance with the base or source 3D asset while differing in localized regions, such as regions associated with modified geometry, alternative materials, changed colors, or added or removed components.

Process 300 includes iteratively generating and optimizing (at 306) a set of radiance field primitives to represent the base or source 3D asset in a second 3D format that differs from the first 3D format. The second 3D format may be a radiance field encoding, such as a Gaussian splatting representation, a neural radiance field, or another primitive-based radiance field representation. Generating and optimizing (at 306) includes performing multiple training iterations in which splats (e.g., Gaussian splats) are created, removed, or adjusted so that renderings generated from the splats reconstruct reference images of the base or source 3D asset with a threshold amount of loss.

In some embodiments, the iterative generation and optimization (at 306) is performed until full convergence of the radiance field representation for the base or source 3D asset. In other embodiments, the iterative generation and optimization (at 306) is performed until a partial convergence state is reached that provides sufficiently accurate primitives for reuse in training the variant radiance field representation, thereby further reducing total training time.

Process 300 includes capturing or rendering (at 308) the base or source 3D asset and the variant 3D asset from the same viewpoints. Capturing or rendering (at 308) may be performed before, during, or after the training iterations at 306. In some embodiments, the renderings generated from the radiance field representation of the base or source 3D asset are used in place of renderings from the original first 3D format in order to ensure that comparisons are performed in a consistent visual domain.

Process 300 includes comparing (at 310) images of the base or source 3D asset rendered from different viewpoints to corresponding images of the variant 3D asset rendered from the same viewpoints. The comparison (at 310) may include computing per-pixel differences, structural similarity scores, perceptual similarity scores, and/or depth-aware differences. In some embodiments, the comparison (at 310) produces one or more difference masks, heatmaps, or confidence maps that quantify similarity or difference across the rendered images.

Process 300 includes differentiating (at 312) regions that match with a threshold amount of similarity from regions that differ based on the comparison results. Differentiating (at 312) may include classifying image-space regions as matching or differing and projecting those classifications back into 3D space using depth values, ray intersections, or correspondence information. In some embodiments, regions that are consistently classified as matching across multiple viewpoints are designated as stable regions suitable for primitive reuse. In some embodiments, RFGS 100 may adjust the threshold for what constitutes a matching or differing region based on performance requirements or customer tiering, where a "premium" tier requires higher accuracy before a region is classified as matching.

Process 300 includes mapping (at 314) the matching regions to the base or source 3D asset. Mapping (at 314) may include associating the matching regions with specific meshes, surface patches, point clusters, or other primitives of the base or source 3D asset in the first 3D format, and further associating those regions with subsets of radiance field primitives in the radiance field representation generated at 306. In some embodiments, mapping (at 314) includes expanding or contracting region boundaries to account for uncertainty, viewpoint sparsity, or projection error.

Process 300 includes locking (at 316) the splats or other radiance field primitives that represent the matching regions of the base or source 3D asset. Locking (at 316) may include preventing any modification of the locked primitives during subsequent training, freezing all parameters of the locked primitives, or freezing a subset of parameters based on attribute-level similarity analysis. The locked primitives collectively form a reusable subset of the radiance field representation that is treated as ground truth for the matching regions. In some embodiments, locking (at 316) the splats includes setting a value in the splat definition that classifies the splat as a locked primitive.

Process 300 includes generating (at 318) a radiance field representation of the variant 3D asset by reusing the locked splats of the base or source 3D asset for the matching regions and iteratively optimizing splats to represent the differing regions of the variant 3D asset. During this generation (at 318), the locked primitives remain fixed while unlocked primitives are adjusted or newly generated through gradient-based optimization to reduce reconstruction loss for the variant 3D asset. For instance, the locked primitives may remain active in the rasterization and blending pipeline to provide essential environmental context, such as accurate shadowing and reflections, for the trainable portions of the asset. However, the optimizer may only be permitted to generate or modify primitives or splats for the variant radiance field representation that are not locked.

Accordingly, RFGS 100 performs a constrained optimization where backpropagation gradients are only computed and applied to unlocked primitives, allowing RFGS 100 or the RFGS 100 optimizer to ignore regions of zero or negligible loss. This selective optimization significantly reduces the total iterations required for the variant 3D asset to converge, reducing the training cycle by orders of magnitude relative to training from scratch or optimizing across all primitives of the variant radiance field representation.

Figure 4:
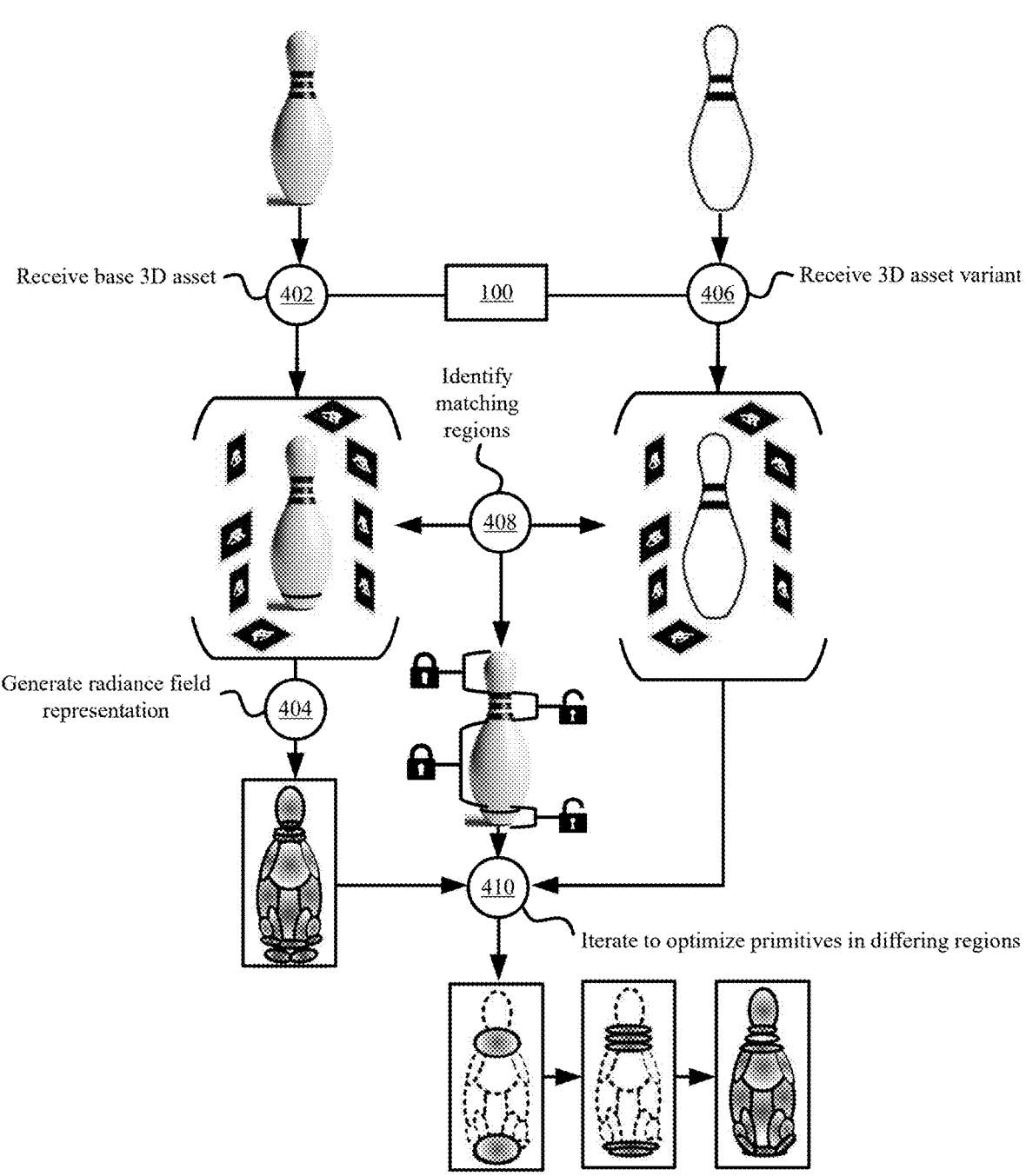
FIG. 4 illustrates an example of modified training for generating a radiance field representation of a variant 3D asset in which optimization is constrained to unlocked radiance field primitives associated with differing regions in accordance with some embodiments described herein.

FIG. 4 illustrates an example of modified training for generating a radiance field representation of a variant 3D asset in which optimization is constrained to unlocked radiance field primitives associated with differing regions in accordance with some embodiments described herein. In particular, FIG. 4 depicts the localized refinement of radiance field primitives where the RFGS 100 leverages a fully converged base representation to accelerate the generation of a variant representation (e.g., a bowling pin asset with a modified neck or top portion).

RFGS 100 receives (at 402) a base or source 3D asset and generates (at 404) a radiance field representation of the base or source 3D asset through standard iterative training until convergence. The radiance field representation may include a plurality of radiance field primitives, such as splats, that collectively reconstruct the visual appearance of the base or source 3D asset.

RFGS 100 receives (at 406) a variant of the base or source 3D asset. RFGS 100 identifies (at 408) matching regions and differing regions between the base or source 3D asset and the variant 3D asset using the visual comparison techniques described above. RFGS 100 locks the radiance field primitives associated with the matching regions in the radiance field representation of the base or source 3D asset. For instance, primitives located within the matching regions (e.g., the base and body of the bowling pin) are marked with locking indicators to signify that their parameters (e.g., position, scale, opacity, and spherical harmonic coefficients) are frozen and excluded from subsequent optimization steps.

RFGS 100 iteratively optimizes (at 410) primitives in only the differing regions of the variant 3D asset while maintaining the locked primitives as a static initialization. In particular, the optimization (at 410) includes training the variant radiance field representation using a constrained optimization process in which gradient updates, primitive generation, and parameter adjustments are limited to unlocked primitives that correspond to the differing regions. During the iterative optimization (at 410) and at each iteration of the optimization, RFGS 100 renders images of the variant radiance field representation from selected viewpoints and computes a reconstruction loss relative to reference images of the variant 3D asset. Although the rendered images may include contributions from both locked and unlocked primitives, gradients derived from the reconstruction loss are selectively applied only to the unlocked primitives. In some embodiments, gradients associated with locked primitives are explicitly masked, zeroed, or excluded from backpropagation such that the parameters of the locked primitives remain unchanged. To reduce the loss computed at each iteration, RFGS 100 may generate new splats in regions where the locked primitives fail to adequately reconstruct the variant 3D asset, adjust parameters of existing unlocked splats (e.g., position, scale, orientation, color, opacity, or spherical harmonic coefficients), and/or remove unlocked splats that do not contribute to reducing reconstruction loss. In some embodiments, the generation of new splats is spatially constrained to volumes, surfaces, or regions that correspond to the previously identified differing regions.

In some embodiments, RFGS 100 constrains the optimization (at 410) by selectively enabling or disabling updates to specific parameters of the unlocked primitives based on attribute-level loss contributions. For example, when the differing regions correspond primarily to appearance differences rather than geometric differences, RFGS 100 may permit updates to color or spherical harmonic parameters of the unlocked primitives while restricting updates to positional or scale parameters. Conversely, when the differing regions correspond to geometric changes, RFGS 100 may permit updates to positional and scale parameters while reusing appearance parameters from the locked primitives where applicable.

In any case, the locked primitives remain fully integrated in the rendering pipeline during optimization (at 410) and provide visual context for the unlocked primitives. For instance, locked primitives may contribute to occlusion, shading, reflections, and global illumination effects, thereby allowing the optimizer to accurately train the unlocked primitives in the context of the full scene rather than in isolation.

The iterative optimization (at 410) may continue until the reconstruction loss for the variant 3D asset falls below a threshold, a maximum number of iterations is reached, or convergence criteria are satisfied. As shown in the progression of the iterative optimization (at 410), RFGS 100 performs a localized "build-up" or convergence where the unlocked primitives or primitives defined in the differing regions are refined over time to match the reference imagery of the variant 3D asset. Since the majority of the radiance field representation is represented by locked primitives that are already accurate, RFGS 100 avoids the from-scratch training iterations normally required to stabilize the base geometry. This ensures that the variant representation achieves visual fidelity and structural correctness in a fraction of the time required by conventional training methods, in significantly fewer iterations, and with reduced computational cost compared to training the variant radiance field representation from scratch or optimizing all primitives.

Figure 5:
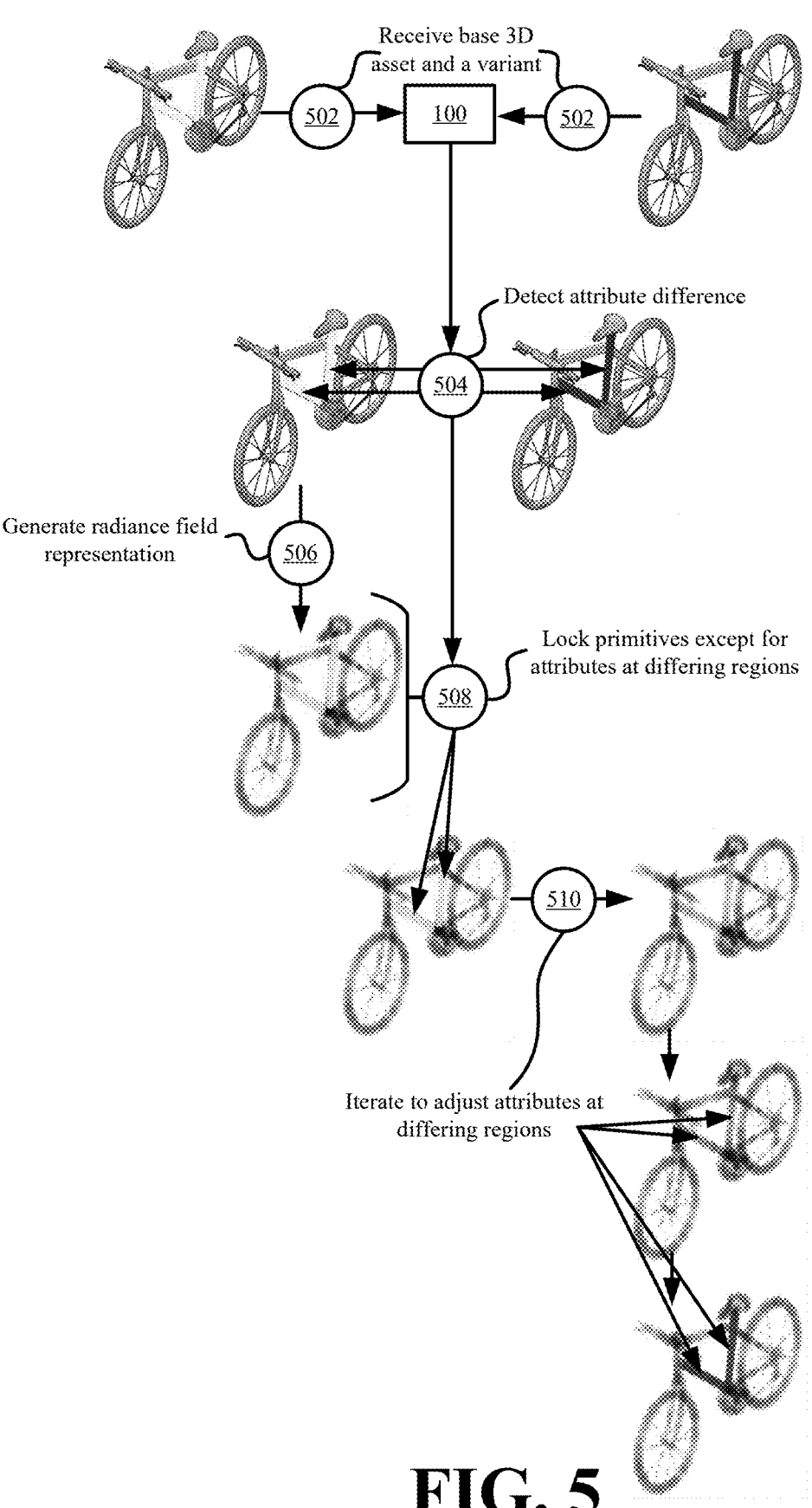
FIG. 5 illustrates an example of accelerated radiance field training utilizing parameter-level locking where optimization is constrained to a specific subset of primitive parameters in accordance with some embodiments described herein.

FIG. 5 illustrates an example of accelerated radiance field training utilizing parameter-level locking where optimization is constrained to a specific subset of primitive parameters in accordance with some embodiments described herein. The accelerated radiance field training depicted in FIG. 5 depicts a more granular approach where individual parameters of a radiance field primitive (e.g., position, scale, orientation, or color) are selectively locked or unlocked based on detected differences between a base or source 3D asset and a variant 3D asset. In particular, FIG. 5 depicts a scenario in which the base or source 3D asset and the variant 3D asset differ primarily in one or more parameters of otherwise corresponding primitives, such as color or appearance, while sharing substantially identical geometric structure.

RFGS 100 receives (at 502) a base or source 3D asset and a variant 3D asset. In this example, the base or source 3D asset and the variant 3D asset structurally represent the same object or scene with minor color variations at certain differing regions.

RFGS 100 detects (at 504) one or more parameter-level differences between the base or source 3D asset and the variant 3D asset. Detecting (at 504) the parameter-level differences may include performing the visual comparison techniques and/or analyzing reconstruction loss contributions at a parameter level for individual radiance field primitives. For example, RFGS 100 may determine whether differences between the 3D assets are predominantly attributable to positional or structural differences, color parameters, spherical harmonic coefficients, opacity values, or other appearance-related parameters. In the example of FIG. 5, RFGS 100 determines that the geometry (e.g., the position and scale of the objects) is identical between the two 3D assets, the visual appearance parameter (e.g., color) differs in two regions.

In some embodiments, detecting (at 504) parameter-level differences includes rendering a radiance field representation trained for the base or source 3D asset from one or more viewpoints and computing a reconstruction loss relative to reference images of the variant 3D asset from the same viewpoints. Rather than attributing the loss solely at a primitive level, RFGS 100 decomposes the loss to estimate how much each parameter of a primitive contributes to the overall loss. Parameters whose loss contributions fall below a threshold may be classified as matching parameters, while parameters whose loss contributions exceed the threshold may be classified as differing parameters.

RFGS 100 generates (at 506) a radiance field representation of the base or source 3D asset. The radiance field representation is defined with splats or radiance field primitives, each defined with multiple parameters such as position, scale, orientation, color, opacity, and spherical harmonic coefficients.

RFGS 100 locks (at 508) all parameters of radiance field primitives representing the matching regions and locks the matching parameters of the radiance field primitives in the differing regions except for the parameters that correspond to the detected differences. In particular, for primitives that are associated with regions where the geometry matches between the base or source 3D asset and the variant 3D asset, RFGS 100 freezes geometric parameters (e.g., position, scale, and orientation) while leaving appearance-related parameters (e.g., color or spherical harmonic coefficients) unlocked when those parameters are identified as differing. Conversely, when appearance parameters match but geometric parameters differ, RFGS 100 may lock appearance parameters and permit updates to geometric parameters.

Locking (at 508) on a per-parameter basis may include setting parameter-specific flags within a primitive definition, applying attribute-level gradient masks, assigning zero learning rates to locked parameters, or otherwise preventing parameter updates for the locked parameters during optimization. As a result, a single primitive may be partially locked, with some parameters remaining trainable while other parameters remain fixed.

RFGS 100 iteratively adjusts (at 510) only the unlocked parameters of the radiance field primitives at the differing regions to generate a radiance field representation of the variant 3D asset. During the iterative adjustment (at 510), RFGS 100 renders images of the variant radiance field representation and computes reconstruction loss relative to reference images of the variant 3D asset. Gradients derived from the loss are selectively propagated only to the unlocked parameters of the primitives, while locked parameters remain unchanged.

In some embodiments, the iterative adjustment (at 510) results in rapid convergence when only appearance parameters differ, since geometric stabilization and spatial coverage are inherited from the base or source radiance field representation. For example, when the variant 3D asset differs by a color change, the optimization may converge after a small number of iterations by adjusting color-related parameters while reusing all geometric parameters from the radiance field representation of the base or source 3D asset.

Accordingly, FIG. 5 illustrates how parameter-level locking further constrains optimization beyond region-level locking by preventing unnecessary updates to primitive parameters that already accurately reconstruct the variant 3D asset. This fine-grained locking enables efficient generation of variant radiance field representations when differences are limited to specific parameters, thereby reducing training time, computational cost, and instability relative to full primitive optimization.

Figure 6:
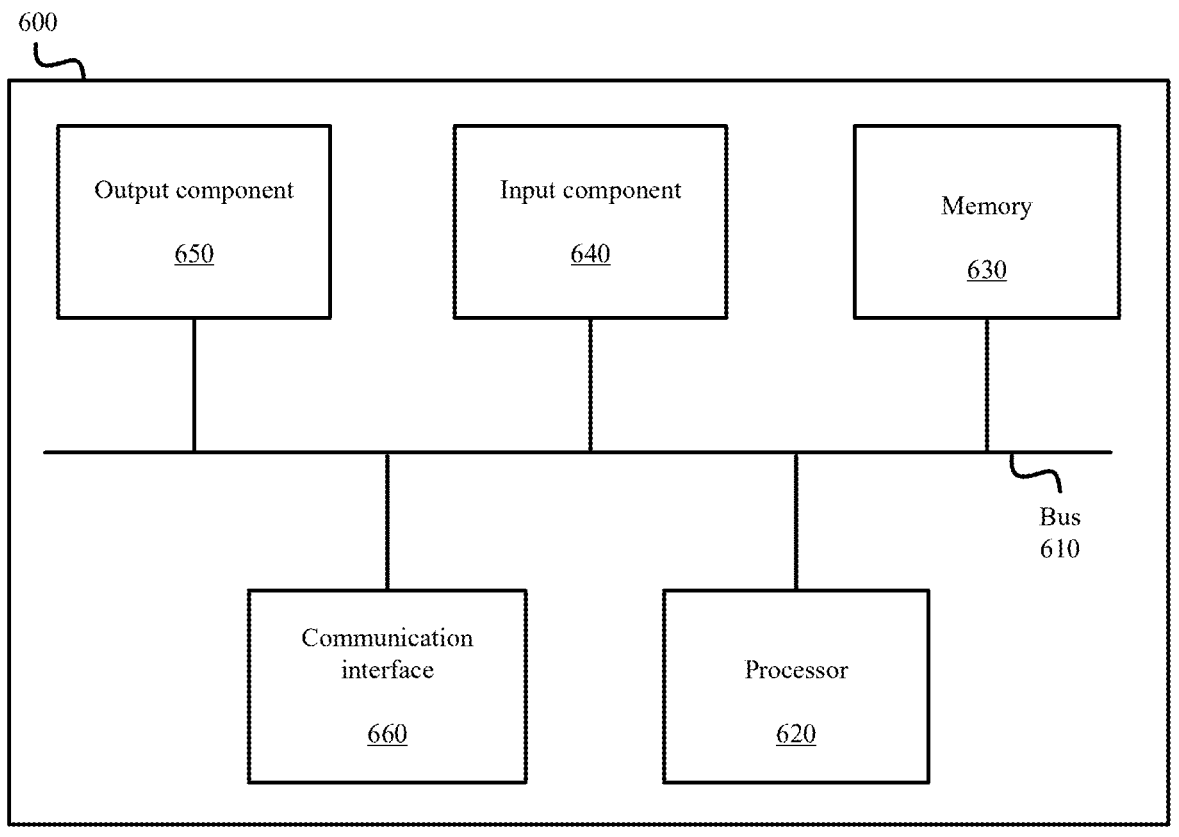
FIG. 6 illustrates example components of one or more devices, according to one or more embodiments described herein.

FIG. 6 is a diagram of example components of device 600. Device 600 may be used to implement one or more of the tools, devices, or systems described above (e.g., RFGS 100). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more LEDs, etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:

receiving a base three-dimensional (3D) asset and a variant 3D asset;

generating a first radiance field representation of the base 3D asset, the first radiance field representation comprising a plurality of radiance field primitives;

identifying matching regions between the base 3D asset and the variant 3D asset by comparing images capturing the base 3D asset and the variant 3D asset from corresponding viewpoints;

locking a first subset of primitives from the plurality of radiance field primitives that represent the matching regions in the first radiance field representation; and generating a second radiance field representation of the variant 3D asset by iteratively optimizing a second subset of primitives corresponding to unlocked primitives that represent differing regions in the second radiance field representation while reusing locked primitives from the first subset of primitives without modification.

2. The method of claim 1 further comprising:

initializing the second radiance field representation using the first subset of primitives.

3. The method of claim 1 further comprising:

determining a common set of camera poses relative to each of the base 3D asset and the variant 3D asset; and generating the images of the base 3D asset and the variant 3D asset from the common set of camera poses.

4. The method of claim 3 further comprising:

calculating a similarity measurement between paired images from a same camera pose using at least one of a pixel-by-pixel difference analysis, a structural similarity comparison, or a perceptual similarity model.

5. The method of claim 1 further comprising:

mapping image differences identified during said comparing back to radiance field primitives of the first radiance field representation.

6. The method of claim 1, wherein the base 3D asset and the variant 3D asset are originally provided in a first 3D format comprising one of a mesh model or a point cloud, and wherein the plurality of radiance field primitives represents the base 3D asset in a second 3D format comprising a splat representation.

7. The method of claim 1, wherein identifying the matching regions comprises:

rendering the base 3D asset and the variant 3D asset from the corresponding viewpoints to produce the images capturing the base 3D asset and the variant 3D asset.

8. The method of claim 1, wherein generating the first radiance field representation comprises:

generating a Gaussian splatting representation, and wherein each radiance field primitive comprises a splat defined by a position, a scale, an orientation, an opacity, and one or more appearance parameters.

9. The method of claim 1, wherein locking the first subset of primitives comprises:

setting a locking indicator for each primitive in the first subset of primitives that prevents parameter updates for the primitive during said iterative optimizing.

10. The method of claim 1, wherein iteratively optimizing the second subset of primitives comprises:

computing loss based on renderings of the second radiance field representation; and adjusting the second subset of primitives based on the loss without adjusting the first subset of primitives.

11. The method of claim 1 further comprising:

performing parameter-specific loss analysis for at least a third subset of primitives from the plurality of radiance field primitives associated with a differing region; and determining that a difference is attributable to a first parameter of the third subset of primitives.

12. The method of claim 11 further comprising:

locking at least a second parameter of the third subset of primitives prior to performing said iterative optimizing; and optimizing the first parameter of the third subset of primitives during said iterative optimizing without adjusting the second parameter.

13. A radiance field generation system comprising:

one or more hardware processors configured to:

receive a base three-dimensional (3D) asset and a variant 3D asset;

generate a first radiance field representation of the base 3D asset, the first radiance field representation comprising a plurality of radiance field primitives;

identify matching regions between the base 3D asset and the variant 3D asset by comparing images capturing the base 3D asset and the variant 3D asset from corresponding viewpoints;

lock a first subset of primitives from the plurality of radiance field primitives that represent the matching regions in the first radiance field representation; and generate a second radiance field representation of the variant 3D asset by iteratively optimizing a second subset of primitives corresponding to unlocked primitives that represent differing regions in the second radiance field representation while reusing locked primitives from the first subset of primitives without modification.

14. The radiance field generation system of claim 13, wherein the one or more hardware processors are further configured to:

initialize the second radiance field representation using the first subset of primitives.

15. The radiance field generation system of claim 13, wherein the one or more hardware processors are further configured to:

determine a common set of camera poses relative to each of the base 3D asset and the variant 3D asset; and generate the images of the base 3D asset and the variant 3D asset from the common set of camera poses.

16. The radiance field generation system of claim 15, wherein the one or more hardware processors are further configured to:

calculate a similarity measurement between paired images from a same camera pose using at least one of a pixel-by-pixel difference analysis, a structural similarity comparison, or a perceptual similarity model.

17. The radiance field generation system of claim 13, wherein the one or more hardware processors are further configured to:

map image differences identified during said comparing back to radiance field primitives of the first radiance field representation.

18. The radiance field generation system of claim 13, wherein the base 3D asset and the variant 3D asset are originally provided in a first 3D format comprising one of a mesh model or a point cloud, and wherein the plurality of radiance field primitives represents the base 3D asset in a second 3D format comprising a splat representation.

19. The radiance field generation system of claim 13, wherein identifying the matching regions comprises:

rendering the base 3D asset and the variant 3D asset from the corresponding viewpoints to produce the images capturing the base 3D asset and the variant 3D asset.

20. A non-transitory computer-readable medium storing instructions that, when executed by one or more processors of a radiance field generation system, cause the radiance field generation system to perform operations comprising:

receiving a base three-dimensional (3D) asset and a variant 3D asset;

generating a first radiance field representation of the base 3D asset, the first radiance field representation comprising a plurality of radiance field primitives;

identifying matching regions between the base 3D asset and the variant 3D asset by comparing images capturing the base 3D asset and the variant 3D asset from corresponding viewpoints;

locking a first subset of primitives from the plurality of radiance field primitives that represent the matching regions in the first radiance field representation; and generating a second radiance field representation of the variant 3D asset by iteratively optimizing a second subset of primitives corresponding to unlocked primitives that represent differing regions in the second radiance field representation while reusing locked primitives from the first subset of primitives without modification.

* * * * *